United States Patent [19]

Davies et al.

[11] Patent Number: 4,564,540
[45] Date of Patent: Jan. 14, 1986

[54] PULTRUDED FIBREGLASS SPACER FOR SEALED WINDOW UNITS

[76] Inventors: Lawrence W. Davies, 139 Brentford Rd., Winnipeg, Manitoba, Canada, R2M 4M3; Jeff Martin, Hudson; Joseph E. Sumerak, both of 207 N. Hayden Pkwy., Hudson, Ohio 44236; Kenneth Church, Box 1186, Gimli, Manitoba, Canada, R0C 1B0

[21] Appl. No.: 512,469

[22] Filed: Jul. 11, 1983

[30] Foreign Application Priority Data

Dec. 8, 1982 [GB] United Kingdom ............... 8234951

[51] Int. Cl.$^4$ .............................................. E06B 3/66
[52] U.S. Cl. ..................................... 428/34; 52/172; 428/36; 428/105; 428/108; 428/114; 428/136; 428/188; 428/294; 428/358
[58] Field of Search ................... 428/34, 36, 38, 358, 428/365, 369, 370, 375, 105, 107, 108, 109, 110, 136, 188, 294, 114; 52/172

[56] References Cited

U.S. PATENT DOCUMENTS

| | | | |
|---|---|---|---|
| 2,138,164 | 11/1938 | Haven | 154/28 |
| 4,335,166 | 6/1982 | Lizardo | 428/34 |
| 4,341,826 | 7/1982 | Prewo et al. | 428/294 |
| 4,343,843 | 9/1982 | Johnson | 428/36 |
| 4,419,400 | 12/1983 | Hindersinn | 428/294 |
| 4,421,810 | 12/1983 | Rasmussen | 428/109 |
| 4,479,988 | 10/1984 | Dawson | 428/34 |

Primary Examiner—George F. Lesmes
Assistant Examiner—William M. Atkinson
Attorney, Agent, or Firm—Jacobson and Johnson

[57] ABSTRACT

A spacer strip for use in a sealed window unit is manufactured from a pultruded fibreglass reinforced body providing a substantially closed hollow body with a slot along one side. The strip is manufactured by pultrusion using a die which is slightly more open than the finished product including a mandrel supported by a web wider than the eventual slot. Closing of the body into the eventual shape is obtained either by differential shrinkage using matting on the outer surface of the body or by squeezing the body between heated rollers. A sealed window unit incorporates the spacer strips between two panes of glass adjacent the edges thereof and incorporates a dessicant communicating with the space between the windows through the slot.

19 Claims, 11 Drawing Figures

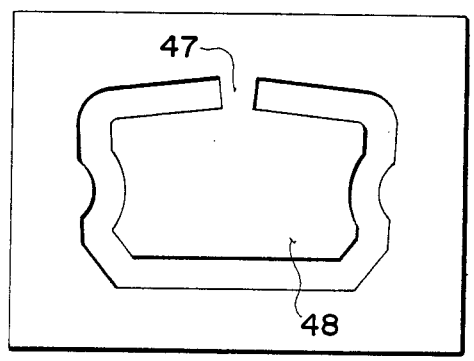
FIG. 1
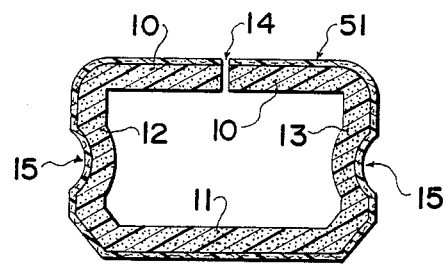
FIG. 2
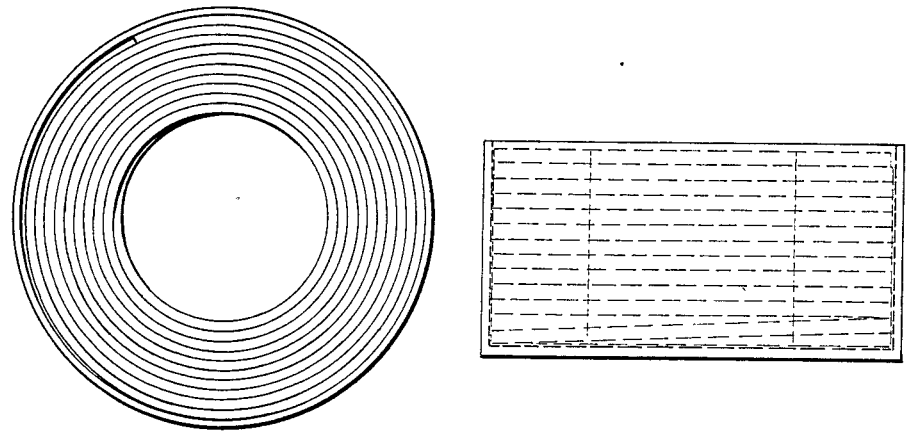
FIG. 3
FIG. 3A

PULTRUDED FIBREGLASS SPACER FOR SEALED WINDOW UNITS

BACKGROUND OF THE INVENTION

This invention relates to spacer for the glass panes in a sealed window unit, to a method for manufacturing the spacer and to a sealed window unit including the spacer.

Sealed window units of this type have been known for many years and have become increasingly important and popular as energy conservation and energy efficiency have become more popular. Such a sealed window unit comprises an outer frame or tape supporting the glass panes and a spacer between the glass panes. The spacer is formed in strips which lie along adjacent edges of the panes so as to define a space therebetween and to support the panes in the defined spacing.

To date the most common material which has been commerically used for the spacer in the manufacture of such units has been steel. Steel has been used mainly exclusively because it has a co-efficient of expansion similar to that of glass and because this property is the most important in the manufacture of such a unit. It will of course be appreciated that any difference in expansion particularly in climates which have large changes in temperature can have many disastrous consequences, particularly as size of the window increases, including cracking of the glass and at least breaking of the seal between the panes of glass. Other metals such as aluminum are completely unsatisfactory on medium to large windows in that the thermal expansion is completely different from that of glass. Similarly many plastics materials such as nylon, vinyl, polythene are available but again these are completely unsatisfactory in view of very different expansion characteristics. To date therefore steel has been the generally accepted material even though this has a number of considerable disadvantages. In particular, the thermal conductivity of steel is considerably higher than that of glass or of the air space between two panes of glass. In a sealed unit heat from within a building tries to escape from a building and the path it takes is through the path of least resistance. In the case of a sealed window unit, the path of least resistance is around the perimeter of the unit where the steel spacer strip is provided. Thus heat is rapidly lost from around the perimeter of the window often causing a ten degrees to twenty degrees farenheit temperature drop at the perimeter of the window relative to the center thereof.

This temperature differential results in differential shrinkage between the center of the glass pane and the perimeter. This can result in a stress crack developing in the glass or with result in the loss of the sealing around the edges of the panes. When the seal breaks down outside air can enter the space between the windows carrying water vapour which is deposited inside the panes causing fogging of the window unit. Approximately five percent of the window units manufactured tend to fail due to such stress cracks, or loss of seal. However it is often thought that the failure is due to shifting of the building rather than to a failure of the window unit itself.

A yet further problem with steel spacer strips is that they are manufactured in certain cut lengths which necessarily cause wastage when cut to specific lengths for use in the window unit. Obviously it is necessary to cut the steel into particular lengths for shipping and handling and of course these lengths cannot be predetermined relative to particular requirements. In addition the finite lengths of the steel strips makes automation of the handling and cutting processes more difficult.

Steel and aluminum spacers of this kind are manufactured by rolling or folding to form a hollow body which is substantially rectangular in cross-section with a slot or interlock along the upper surface between the two folded edges of the steel strip from which the folded body is formed. It is important to maintain the width of the slot as narrow as possible in order to allow the ingress of air from the space between the window panes while preventing the escape of granular dessicant material. In manufacture of a window unit using the spacer, dessicant is added into the interior of the hollow spacer so as to dry out the air remaining between the panes of glass so that no water is condensed onto the inside faces of the glass thus fogging the window unit. Steel which is very unsuitable for extrusion processes can however be readily formed by a folding process into a shape of this type. However folding processes are limited in the type of shape that can be formed.

SUMMARY OF THE INVENTION

It is one object of the invention therefore to provide a spacer for a sealed window unit which overcomes the disadvantages of the steel spacer used to date.

Accordingly, the invention provides a spacer for a sealed window unit comprising an elongate hollow body of substantially rectangular cross-section dimensioned such that the transverse faces have a width sufficient to space two panes of glass in the sealed window unit, one of the transverse faces being apertured by the provision of a slot along the full length thereof having a slot width so as to allow the ingress of moisture into the hollow body while preventing the escape through the slot of a granular dessicant from the hollow body, wherein the hollow body is formed by pultrusion from a thermosetting resin material having a coefficient of thermal expansion substantially equal to that of glass.

Surprisingly, therefore, the invention provides a spacer of the shape and type previously known in steel which is manufactured by a pultrusion technique from a glass fibre reinforced thermosetting resin material having a coefficient of thermal expansion substantially equal to that of glass.

One particular problem which arises with a spacer unit of this type is that in forming the desired slot along the inner transverse edge of a width which allows the ingress of air to the dessicant while preventing the escape of the dessicant.

This problem is solved by a technique in which the product is formed through a die having a web supporting the inner mandrel with the web forming the slot but at a width wider than the required slot width following which, after emergence from the die, the hollow body is closed either by a differential contraction technique or by a compression technique.

The invention also includes a sealed window unit incorporating said spacer and also methods of manufacturing the spacer.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a cross-sectional view through the die of a pultrusion process showing the initial shape of a spacer strip manufactured by a pultrusion technique.

FIG. 2 is a cross-section through a spacer strip ready for use in a sealed window unit.

FIGS. 3 and 3A are front elevational and plan views respectively of a roll of spacer strip formed by the pultrusion technique provided in a form suitable for transport and handling.

DETAILED DESCRIPTION

Figures 4, 5:
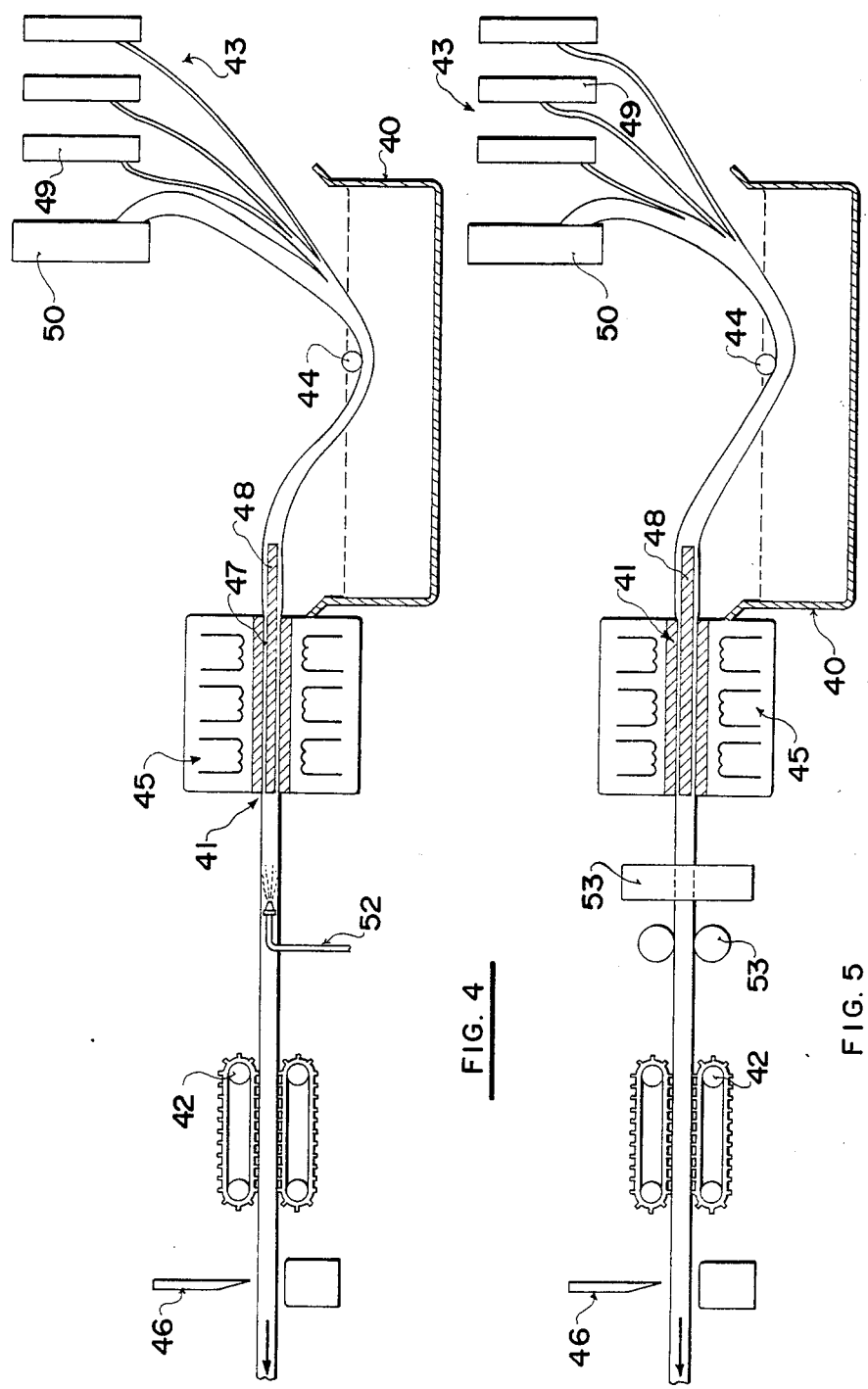
FIG. 4 is a schematic illustration of the pultrusion technique for use in manufacturing a spacer strip as shown in FIG. 2 and employing a die of the cross-section shown in FIG. 1.
FIG. 5 is a sketch similar to that of FIG. 4 showing a modified pultrusion technique employing squeeze rollers for closing the pultruded cross-section.

In the drawings like characters of reference indicate corresponding parts in the different figures.

Figure 6:
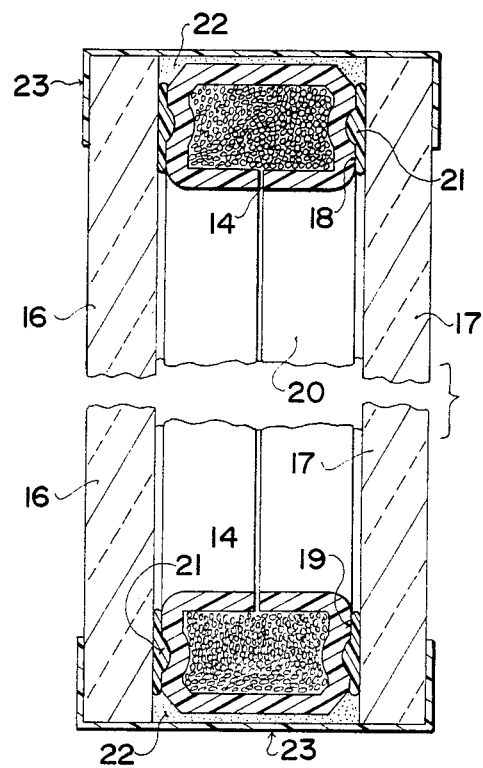
FIG. 6 is a cross-sectional view through a sealed window unit employing the spacer of FIG. 2.

The pultruded spacer is shown in cross-section in FIG. 2 and in situ in a sealed window unit in FIG. 6. It comprises an elongate hollow substantially closed body formed of a glass fibre reinforced pultruded material by method as will be described in more detail hereafter. The body comprises substantially straight upper and lower walls 10 and 11 and side walls 12 and 13. The upper wall 10 includes a slot centrally thereof running along the full length of the body, the slot indicated at 14. Each of the side walls 12, 13 includes a recess or groove 15 running along the full length thereof adjacent to the mid-point thereof. The walls 10 through 13 are joined by smooth curves so as to avoid weakened sections provided by sharp corners.

The body is dimensioned such that the walls 12, 13 are spaced by the desired spacing between two panes of glass which in practice is of the order of 0.5 inches (1.25 centimeters). The height of the walls 12, 13 can be chosen in accordance with requirements but generally is of the order of 0.3 inches (0.8 centimeters) which is sufficient to provide adequate strength and also adequate adhesion to the glass.

The spacer is shown in FIG. 6 in a sealed window unit in which the two panes of glass are indicated at 16, 17 respectively and it will be appreciated that a length of the spacer is arranged at each of the four adjacent sides of the panes of glass with two such spacers at the top and bottom indicated at 18, 19 with the third spacer along the rear side as shown in the drawing indicated at 20. The spacer along the front side is not shown in the cross-section.

In manufacture of the sealed window unit with the glass cut to size, the spacers are cut to size and may be mitered or may be square cut with a corner insert used for connection so that they can lie along each of the adjacent sides of the panes of glass recessed slightly inwardly from the edge of the glass. Each of the spacers has along its side walls 11, 12, 13 is suitably primed or etched by chemical or mechanical means so as to improve adhesion between the spacer and a sealing or filling agent indicated at 21 and the glass. The sealing agent 21 for example of a butyl material is inserted into the recesses 15 along the side wall 12, 13 so as to ensure that the spacer is sealed to the inside surfaces of the glass panes.

After assembly of the two panes of glass and the spacers with the sealing agent along the edges, the recess defined between the outside surface of the wall 11 of the spacer and the edge of the panes of glass is filled with a further quantity of a sealing agent for example a polysulphide material indicated at 22. Finally a tape 23 is applied to all the edges of the sealed window unit so as to extend slightly around the outer face of the glass panes for handling and to assist in securing the glass panes together and to yet further ensure a seal around the glass panes.

Prior to assembly of the sealed window unit a granular dessicant material is inserted into one or more of the spacer strips. Such granular dessicants are well-known in the trade and act to extract all the moisture from the air trapped between the glass panes so as to prevent any condensation within the glass panes. The slot 14 of the spacer strip as used in the sealed window unit is designed to have a width less than 0.025 inches (0.6 milimeters). Such a width is sufficiently narrow to retain the granular dessicant, with the choice of the actual width and the type of dessicant within the normal skill of one in the art. In practice all four spacer strips are filled loosely with the dessicant to ensure that sufficient is provided to extract all the moisture from the space between the panes.

Figure 7:
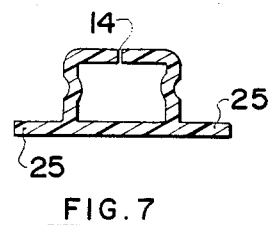
FIG. 7 is a cross-sectional view through a modified spacer incorporating channel sections for supporting the glass panes in a bi-pane arrangement.
Figure 8:
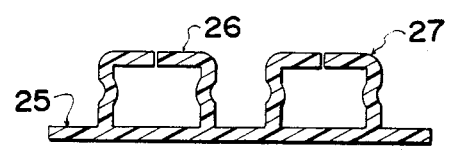
FIG. 8 is a further modified spacer for use in a tri-pane arrangement.

FIGS. 7 and 8 show modified spacer strips which are basically of the same structure as shown in FIGS. 2 and 6 but include portions forming flat sections on either side of the basic spacer strip for receiving and seating the glass panes. More specifically FIG. 7 shows a two-pane strip including base portions at 25 for receiving the glass panes. FIG. 8 shows a three-pane strip including two spacer strips 26, 27 and two base sections 25 thus defining three sections for seating the three glass panes.

Figure 9:
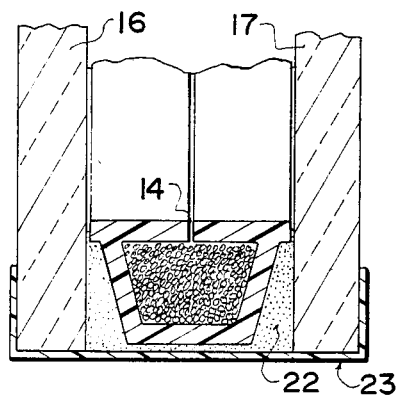
FIG. 9 is a view similar to that of FIG. 6 showing a modified spacer strip.

FIG. 9 shows a modified spacer strip in which the shaping of the side walls 12, 13 is altered to replace the channels 15 by a wedge shape so that only one type of sealant, that is polysulphide, can be used.

The pultrusion technique by which the basic spacer strip is manufactured as described in more detail hereinafter lends itself particularly to more complex shapes as shown in FIGS. 7 and 8 whereas spacer strips manufactured from the previously used steel material cannot readily accomodate the more complex shapes shown.

Turning now to the details of manufacture of the spacer strip, the preferred apparatus for the manufacture is shown schematically in FIGS. 1 and 4 with a modified version in FIG. 5. Specifically FIG. 4 shows a pultrusion technique comprising a resin bath 40, a die 41, a puller 42, and a glass fibre supply 43. Generally glass fibres from the supply are drawn into the resin bath in which they are emersed by a bar 44 within the bath so as to become fully coated with the resin. The fibres are then drawn into and through the die 41 with any excess resin running back from the entrance to the die into the bath. The die is heated by a plurality of electrical resistance contact heaters schematically indicated at 45 so as to heat the thermo setting resin to a controlled temperature at which it gradually sets as the resin and glass fibers are drawn through the die. The pulling is carried out by the puller 42 which comprises a pair co-operating tracks which grasp the pultruded substantially set strip and draw it from the die toward a cutter 46 and a packing station (not shown) downstream of the cutter.

The die is shown in longitudinal cross-section in FIG. 4 and in transverse cross-section in FIG. 1. It will be noted that the shape of the die in FIG. 1 is substantially the same as the finished item shown in FIG. 2 except that the web 47 supporting the mandrel 48 is wider than the slot 14 in the finished item. This increased width is provided to enable the mandrel 48 which shapes the interior of the strip to be supported directly on the die by the web 47. The width of the web 47 is of the order of 0.080 inches (0.203 centimeters) and can lie in the range 0.050 inches to 0.15 inches.

The increased width at the slot 14 in the die is achieved by opening the body by an angle of the order of three degrees at each of the corners. Thus the upstanding wall 12 is in the die three degrees further out than in the finished item and also the wall forming one-half of the upper surface 10 is at an angle of three degrees greater than the finished item relative to the wall 12. The other half of the die is symmetrically arranged. Thus the halfs of the upper wall 10 lie at six degrees to a transverse plane. This half-angle which in the preferred example described is three degrees can lie in the range 1 degrees to 6 degrees.

The supply 43 comprises a plurality of spools 49 of glass fibre roving which is an untwisted strip containing a plurality of glass fibres. In addition a single reel of matting is provided at 50. The matting is of a width such that it can substantially extend around the full periphery of the die and can contain the roving strands to the inner areas of the die. Guides, as will be apparent to one skilled in the art but not shown in the drawings are provided so as to guide the roving and the matting so that the matting wraps around the roving prior to the entry into the die and the roving is properly spaced around the die. For this purpose in one example the mandrel 48 extends outwardly from the entry end of the die. The mandrel commences at a square cross-section gradually changing to the required die cross-section as it approaches the entry to the die. In this way by the time the fibres actually enter the die they have been properly oriented by the mandrel so as to be properly spaced in the finished pultruded item. The temperature of the die and the rate of advance of the fibres through the die is chosen and arranged such that the resin substantially completely cures or sets in the die. In this way when the pultruded strip emerges from the die the resin is substantially completely set with possibly a small amount of setting occuring in the first few inches beyond the end of the die. Alternative arrangements may be used for orienting the fibres before entering the die, which do not require the elongated mandrel but use seperate guides prior to the die.

The positioning of the fibres in the finished item is shown schematically in FIG. 2 where the matting 51 lies around the outside of the finished item and the uni-directional fibres from the roving lie inside the matting. The matting can comprise any bi-directional arrangement of fibres provided by a non-woven random matting from continuous fibre or cut fibres or for example a stitched non-woven matting. Woven matting is not preferred since bias forces can be set up in the finished item from the forces in the weave which can be unsatisfactory. However any two-directional arrangement of glass fibres can be used and the term "matting" is used in this context.

As the strip emerges from the die, the resin is still in the process of cooling and to some extent setting. Thermo-setting resins on cooling and setting tend to contract by a varying amount depending on the particular resin chosen whereas the glass fibres contract very little if at all. As the matting 51 provides glass fibres extending around the periphery of the strip, the outside periphery tends to shrink on cooling and setting. However the inner portions which include only uni-directional fibres along the length of the strip tends to shrink to a greater extent because the resin in between the individual fibres is allowed to contract. In this way a differential shrinkage ocurs whereby the inner layers shrink to a greater extent than the outer layers thus pulling in the body particularly at the corners so that the three degrees provided by the die shape is taken up in the differential shrinkage to form the finished item as indicated in FIG. 2.

This process can be used not only in the manufacture of spacer strips but for any hollow body which is not completely closed.

For convenience of manufacture paint spraying guns 52 are positioned on both sides and bottom of the strip immediately before the puller 42 so as to coat the side walls with a paint primer. Suitable mechanical etching techniques may be employed as an alternative to the chemical method just described. Downstream of the puller 42 the cutter 46 can be used to cut the strip into convenient lengths for shipping for example twenty to forty feet depending upon requirements.

As an alternative, the use of the matting in the strip allows the strip to flex sufficiently to curve with a radius of curvature of the order of five feet but not less than 3 feet. The minimum radius of curvature is determined by the Follins Formula:

$$\tfrac{1}{2}\text{ part thickness}-0.003=\text{Minimum hoop radius}$$

This is important if different part heights 12, 13 are employed.

Thus instead of cutting the strip can be rolled onto the interior of a drum of the order of ten feet diameter shown schematically in FIGS. 3 and 3A so as to form a package of the strip of the order to two thousand feet or more in length. The diameter of ten feet can be modified in practice but is convenient in that it provides a transportable package of the strip without deforming the strip sufficiently to form permanent kinks which would be unacceptable in the manufacture of the sealed window unit. The supply of the strip in continuous length is advantageous for automated cutting and mitering equipment in the manufacture of the sealed window units. The packaging of the strip on the interior of a drum is used in view of the high forces stored by the flexing which could be dangerous if suddenly released by cutting straps on an exteriorly rolled package.

In FIG. 5 is shown a slightly modified process from that of FIG. 4 in which the matting 51 is omitted from the exterior of the strip so the strip is formed wholly of roving or possibly from spun roving which includes some bi-directional strength. Alternatively matting can be placed randomly within the part to avoid the differential shrinkage described above. In this modification the closing of the strip to the final shape is accomodated by heated rollers 53 which squeeze the strip and complete the final curing of the resin. In this example the temperature of the die may be decreased slightly to reduce the amount of setting occuring in the die to say ninetyfive percent of the completely set condition. The rollers 53 are positioned downstream of the die and upstream of the puller 42.

The amount of fibres used lies in the range twenty-five to eighty percent by weight of the total finished body. In the embodiment employing matting on the outer surface, the percentage of bi-directional fibres lies in the range five to forty percent of the total part. The positioning of the matting is preferably directly on the outer surface of the body since this can be most easily accomodated and arranged by suitable guides. However the differential shrinkage can be obtained provided the bi-directional fibres lie closer to the outer surface than the inner surface.

Protection against ultra-violet light degradation of the spacers can be provided in conventional manner for example by the introduction of titanium dioxide which also provides a pigment for the spacer.

Figure 10:
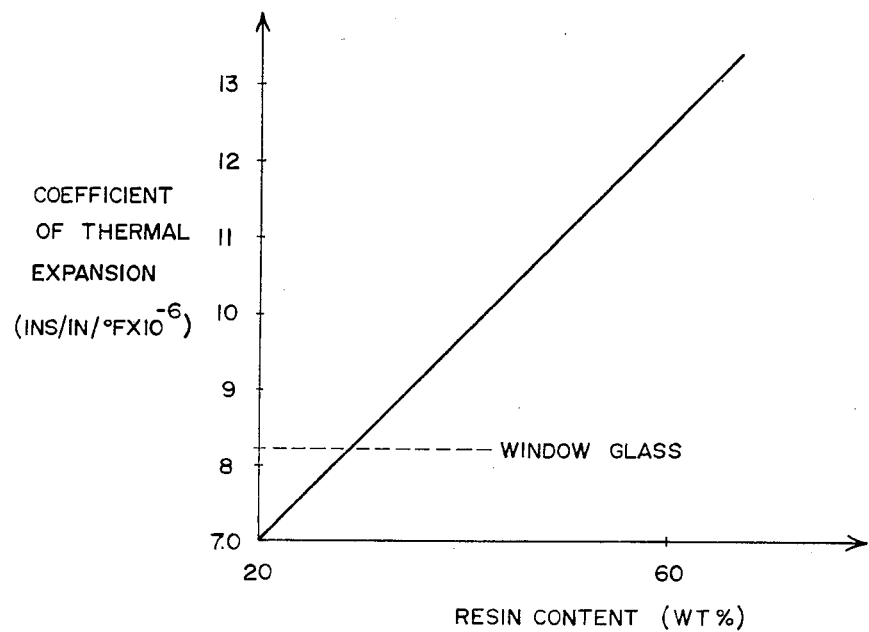
FIG. 10 is a graph showing the relationship between resin content and coefficient of thermal expansion of the spacer.

FIG. 10 is a graph showing the relationship between the proportion of solids content in the spacer to the resin content and the coefficient of thermal expansion of the finished part. The present inventors have determined that a substantially linear relationship exists between these characteristics by which the exact coefficient of thermal expansion of the spacer can be tailored to the required figure to accurately or substantially match the coefficient of the window glass concerned. It will be appreciated that while window glass has a coefficient of expansion around 8.2, this can vary in dependence upon the type of glass used and particularly when additives are included in the glass for example to provide an increased degree of reflection.

Thus armed with knowledge of the type of glass for which the spacer is intended, the coefficient of thermal expansion of the spacer can be specifically chosen to match that of the glass. The graph of FIG. 10 provides guidance on how this tailoring should be achieved. It will be appreciated that the resin, as explained previously, has a greater coefficient of thermal expansion than the glass and hence the proportion of resin to glass has an effect on the coefficient of the finished part.

The solids content in the finished part can comprise either wholly glass fibres or can comprise various fillers known in the art. The fillers are either added specifically as a separate filler to the resin or comprise a part of the resin as thermo plastic solids in the resin. The amount of resin therefore can be decreased by adding fillers while retaining the proportion of glass constant. As an alternative the proportion of resin can be increased by increasing the proportion of bi-directional to uni-directional fibres. The larger amount of bi-directional fibres that are present provides increased spaces between the fibres for acceptance of resin. Thus the man skilled in art can vary the proportion of bi-directional to uni-directional fibres and also can vary the filler content of the finished part to specifically tailor the solids to resin proportion to obtain the required coefficient of thermal expansion.

In one example containing 60% resin and 40% solids the coefficient of thermal expansion was 13 ins/in degree $F \times 10^{-6}$ (23.4 centimeters/centimeter/degree $C \times 10^{-6}$). In a second example employing 80% glass and 20% resin content the coefficient of thermal expansion was 7 ins/in degree $F \times 10^{-6}$. The percentages are stated by weight.

It will be appreciated therefore the present invention provides a number of specific advantages relative to the prior art. Firstly the substantially decreased thermal conductivity of the spacer strip can improve the R-value of a sealed triple-paned window unit by 0.203hr sq. ft. F/Btu. This is an improvement of 6.2% over a window with conventional steel pane spacer. This R-value is a characteristic of the entire window construction and hence of course will vary for different types of windows.

Secondly the tailoring of the coefficient of thermal expansion of the spacer strip to that of the glass enables the manufacture of larger sealed window units with a decreased risk of failure due to thermal stress.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A spacer for a sealed window unit comprising an elongate hollow body of substantially rectangular cross-section defining two transverse faces dimensioned such that the transverse faces have a width sufficient to space two panes of glass in the sealed window unit, one of the transverse faces being apertured by the provision of a slot along the full length thereof having a slot width as as to allow the ingress of moisture into the hollow body while preventing the escape through the slot of a granular dessicant from the hollow body, wherein the hollow body is formed by pultrusion from a thermosetting material reinforced by a proportion of elongate continuous glass fiber material oriented longitudinally throughout the length of said body so as to provide for the body a coefficient of thermal expansion substantially equal to that of glass.

2. A spacer according to claim 1 wherein the hollow body is reinforced with twenty-five to eighty percent by weight of glass fibres.

3. A spacer according to claim 1 wherein the width of the slot is less than 0.025 inches.

4. A spacer according to claim 1 wherein the width of the spacer is of the order of 0.5 inches and wherein the height of the spacer is less than the width and wherein the side walls include a depression along the length thereof adjacent the mid-point thereof for receiving a sealing agent.

5. A spacer according to claim 1 of sufficient flexibility to allow the hollow body to be curved to a radius of curvature less than five feet.

6. A spacer according to claim 5 wherein the spacer is formed into a roll of diameter less than 10 feet and length greater than 2,000 feet.

7. A spacer according to claim 1 including some substantially uni-directional reinforcing fibrous material and some bi-directional reinforcing fibrous material.

8. A spacer according to claim 7 wherein the majority of the reinforcing fibrous material is substantially uni-directional.

9. A spacer according to claim 7 wherein there is five to forty percent bi-directional fibrous material by weight.

10. A spacer according to claim 7 wherein there are more bi-directional fibres provided adjacent the outer surface of the hollow body than adjacent the inner surface thereof.

11. A spacer according to claim 7 wherein the bi-directional fibres are provided by a layer thereof adjacent the outer surface of the hollow body.

12. A spacer according to claim 7 wherein the bi-directional fibrous material comprises matting.

13. A spacer according to claim 12 wherein the matting is non-woven.

14. A spacer according to claim 1 formed by pultrusion through a die wherein the slot is formed by a web supporting a mandrel of the die which mandrel is shaped to form the interior of the body.

15. A spacer according to claim 14 wherein the slot is reduced in width subsequent to the emergence of the body from the die.

16. A spacer according to claim 15 wherein the slot is closed by compression of the body between two heated rollers downstream of the die and prior to complete curing of the body.

17. A spacer according to claim 15 wherein the surface on either side of the slot prior to closing of the slot lies at an angle in the range of 1 to 6 degrees to a plane transverse to the body.

18. A sealed window unit comprising two panes of glass arranged in spaced parallel relationship, and four spacers each arranged between the panes along two adjacent edges of the panes and each comprising an elongate hollow body of substantially rectangular cross-section defining two transverse faces dimensioned such that the transverse faces have a width sufficient to contact the panes in the spaced parallel relationship, a granular dessicant within the hollow body, the transverse face of the hollow body extending inwardly of the panes being apertured by the provision of a slot along the full length thereof having a slot width so as to allow the ingress of moisture into the hollow body to the dessicant while preventing the escape through the slot of the granular dessicant from the hollow body, the hollow body being formed by pultrusion from thermosetting material reinforced by a porportion of elongate continuous glass fiber material oriented longitudinally throughout the length of said body so as to provide for the body a coefficient of thermal expansion substantially equal to that of the glass panes.

19. A spacer for a sealed window unit comprising an elongte hollow body of substantially rectangular cross-section defining two transverse faces dimensioned such that the transverse faces have a width sufficient to space two panes of glass in the sealed window unit, one of the transverse faces being apertured by the provision of a slot along the full length thereof having a slot width so as to allow the ingress of moisture into the hollow body while preventing the escape through the slot of a granular dessicant from the hollow body, wherein the hollow body is formed by pultrusion through a die from a thermosetting material reinforced by a proportion of elongate continuous glass fiber material oriented longitudinally throughout the length of said body, said die having a web wider than the slot width and a mandrel supported by the web whereby the slot is defined by the web and a hollow interior of the body shaped by the mandrel and wherein subsequent to emergence from the die the slot is reduced to said slot width.

* * * * *